United States Patent [19]
Baker et al.

[11] Patent Number: 5,611,841
[45] Date of Patent: Mar. 18, 1997

[54] VAPOR RECOVERY PROCESS USING BAFFLED MEMBRANE MODULE

[75] Inventors: Richard W. Baker, Palo Alto; Douglas Gottschlich, Mountain View; Thomas Hofmann, Sunnyvale; Scott Segelke, Mountain View, all of Calif.; Matthias Wessling, Enschede, Netherlands

[73] Assignee: Membrane Technology and Research, Inc., Menlo Park, Calif.

[21] Appl. No.: 536,522

[22] Filed: Sep. 29, 1995

[51] Int. Cl.$^6$ .......................... B01D 53/22; B01D 63/10
[52] U.S. Cl. ...................................... 95/50; 96/4
[58] Field of Search .................. 95/45, 50; 96/4; 210/321.74, 321.76, 321.81, 321.83, 321.85, 321.9

[56] References Cited

U.S. PATENT DOCUMENTS

| | | | |
|---|---|---|---|
| 3,903,694 | 9/1975 | Aine | 95/50 X |
| 4,033,878 | 7/1977 | Foreman et al. | 210/336 |
| 4,765,893 | 8/1988 | Kohlheb | 210/315 |
| 4,814,079 | 3/1989 | Schneider | 210/321.83 |
| 4,994,094 | 2/1991 | Behling et al. | 95/50 X |
| 5,034,126 | 7/1991 | Reddy et al. | 210/321.74 |
| 5,044,166 | 9/1991 | Wijmans et al. | 62/85 |
| 5,096,584 | 3/1992 | Reddy et al. | 210/321.74 |
| 5,154,832 | 10/1992 | Yamamura et al. | 210/640 |
| 5,281,255 | 1/1994 | Toy et al. | 95/50 |
| 5,464,466 | 11/1995 | Nanaji et al. | 95/50 X |

FOREIGN PATENT DOCUMENTS

| | | | |
|---|---|---|---|
| 4214551 | 10/1993 | Germany | 96/4 |
| 4225170 | 2/1994 | Germany | . |
| 4327524 | 2/1995 | Germany | 95/50 |
| 3-028104 | 2/1991 | Japan | 96/4 |
| 3-056114 | 3/1991 | Japan | 95/50 |
| 3-238020 | 10/1991 | Japan | 96/4 |
| 6-114229 | 4/1994 | Japan | 95/50 |
| 6-099016 | 4/1994 | Japan | 96/4 |

*Primary Examiner*—Robert Spitzer
*Attorney, Agent, or Firm*—J. Farrant

[57] ABSTRACT

A gas-separation method for controlling vapor emissions. The method employs a spiral-wound membrane module, adapted to provide one or more feed-side baffles in the feed channel. The method may be used to control vapor emissions from a volatile liquid, and is particularly useful to control fuel vapors emitted during fuel transfer operations.

53 Claims, 6 Drawing Sheets

VAPOR RECOVERY PROCESS USING BAFFLED MEMBRANE MODULE

This invention was made in part with Government support under Contract Number 68D30132, awarded by the U.S. Environmental Protection Agency. The Government has certain rights in this invention.

FIELD OF THE INVENTION

The invention relates to the control of vapor emissions from tanks containing volatile liquids, such as fuel tanks. Particularly, the invention relates to membrane-based removal of vapors from tank vent gas streams.

BACKGROUND

In states where vapor recovery at gasoline retail stations is required, booted filling nozzles are used. Vapors emitted during filling are redirected to the underground storage tanks via a boot around the filling pipe. However, the clumsiness of the nozzle and the imperfect fit of the boot on the tank pipe cause many gasoline stations to install bootless, vacuum-assisted recovery systems. The bootless system pulls in air via the nozzle and redirects the hydrocarbon vapor/air mixture to the underground tank.

The flow rate of gasoline going to the car and the flow rate of the vapor/air mixture returning to the storage tank must be exactly balanced to maintain constant ambient pressure inside the tank. If the pressure in the storage tank increases, gasoline vapors are emitted from the vent pipe of the tank. The composition of the vented vapors varies depending on the composition of the fuel itself and the environmental conditions. Most gasoline fuels consist of a mixture of straight- and branched-chain hydrocarbons, alcohols, ethers or other oxygen-containing compounds, and other minor components. The hydrocarbons range from light volatiles, such as $C_7$ or below, to $C_{12}$ or heavier, relatively involatile materials. Thus the vapor emissions also vary, but might typically consist of a mixture of $C_3-C_7$ hydrocarbons, with other minor components. The flow rates of such vent emissions are generally small, less than 10 scfm and typically in the range 0.5-2.0 scfm.

Various technologies for controlling or destroying organic vapors in waste streams exist.

Several of these could, in principle, be used to control vent emissions from the fuel storage tanks at a gas station. Carbon adsorption is effective, but expensive due to high costs for carbon regeneration or replacement. Incineration creates a safety hazard, and the sight of an open flame at a gasoline retail station might cause concern among consumers. Catalytic oxidation requires a gas stream that is constant in volume and concentration. Since gasoline vapor emissions at retail stations fluctuate throughout the day, extensive controls are required, making this approach unattractive. Condensation is generally too costly, due to the low temperatures required for adequate gasoline vapor recovery.

It is known to apply membrane separation systems to the separation of organic vapors from other gases, and even specifically to the recovery of vent vapors. For example, U.S. Pat. No. 5,044,166 describes a membrane separation system for recovery of chlorofluorocarbon or other emissions from refrigeration purge vents. German Patent DE 42 25 170 A1, to Roland Pelzer, describes a system that maintains sub-atmospheric pressure in the underground fuel storage tank, while using a membrane system to recover air/fuel vapor emissions.

Even though membranes are available that have good intrinsic separation properties for hydrocarbon vapors over air, relatively poor separation performance can be achieved in practice. One factor that makes the use of membrane systems unattractive is the small flow rates of the streams to be treated. In a typical small spiral-wound module, containing about 1 $m^2$ of membrane in a single leaf, a vent gas flow rate of, for example, 1 scfm translates to a bulk gas velocity of only 0.7 m/s or less within the feed channels of the module.

As with any fluid flowing across a surface, the velocity profile of the gas in the feed channels is not constant across the thickness of the channel, because of friction at the gas/membrane interface. The gas velocity decreases as the distance from the membrane surface decreases and a stagnant boundary layer is present near the membrane surface. The gas mixture concentration is uniform outside the stagnant boundary layer, because the flow is turbulent. However, the flow in the boundary layer is laminar, producing a concentration profile across this layer as the faster permeating components are removed preferentially through the membrane.

The effect of concentration polarization is that components that are enriched in the permeate are depleted in the boundary layer, and components that are depleted in the permeate are enriched in the boundary layer. For further separation of the faster-permeating components to occur, these must cross both the boundary layer and the membrane. Thus, the boundary layer acts as an additional resistance, in series with the membrane, to transport from the bulk feed to the permeate side of the membrane.

If other considerations make it possible, removal of the faster-permeating components from the feed stream can be improved by increasing the feed flow rate through the module, because this promotes turbulence, reduces the thickness of the boundary layer, and thereby reduces the boundary layer resistance. If a large membrane area is required to perform a separation, then concentration polarization problems can be addressed by dividing the membrane area between multiple small modules in series, rather than using one large module. This maintains a higher flow rate and a more turbulent flow.

In vent-stream applications of membrane technology, however, this is often not possible. If the flow rate of the vent gas is just a few scfm, then the membrane area required to treat the stream may be just a few square meters, such as 1 $m^2$, 2 $m^2$ or 5 $m^2$, and dividing this small area between multiple modules may be difficult and costly.

Thus, despite the availability of diverse control technologies, there remains a need for better methods of controlling emissions from fuel transfer operations, in particular, emissions from automotive fuel dispensing at gasoline stations.

Another factor to be taken into account in addressing this problem is that the current bootless vapor recovery system could be improved if more air could be drawn in at the nozzle, and the air then selectively removed from the tank without loss of the fuel vapor. The hydrocarbon vapors could be recovered and returned to the tank, and the problem of fugitive emissions would be eliminated.

Of course, emissions control problems of this type are not limited to retail automobile fuelling. The same or similar considerations apply to other fuel transfer operations, such as transfer from underground tanks at tank farms into tanker trucks; from tanker trucks into underground storage tanks at gasoline retail stations and other fueling sites; from storage tanks into small tank trucks used for off-site refueling; and dispensing of fuels into vehicles other than automobiles, such as, trucks, construction vehicles, aircraft, boats, and ships. Likewise, in a more general sense, the same types of problems are confronted by owners and operators of all facilities that use tanks containing potentially volatile liquids, including fuels, solvents, reagents, and other organic and inorganic materials.

Co-owned and copending applications 08/535,983 and 08/536,633, which are incorporated herein by reference in their entirety, discuss spiral-wound modules that use baffles in the feed and/or permeate channel to produce counter-current feed/permeate flow patterns. The applications cite the following references as representative examples: U.S. Pat. Nos. 5,154,832; 5,096,584; 5,034,126; 4,814,079; 4,765,893; and 4,033,878.

SUMMARY OF THE INVENTION

The invention is a method for treating vapor emissions from tanks containing volatile liquids. In its most general aspect, the invention applies to any tank containing a potentially volatile liquid.

In one specific aspect, the invention applies to tanks used to store vehicle fuels, such as ground transportation, aviation or marine fuels, particularly gasoline and other hydrocarbon fuels.

In a narrower aspect, the invention applies to control of gasoline vapor emissions at retail automobile gasoline stations.

In all aspects, the method of the invention is carried out by using a spiral-wound membrane module installed in the vent line of the tank to separate the vent stream into a volatile-compound-enriched permeate, which can be returned to the tank, and a volatile-compound-depleted residue. If the other component of the vent stream is air, the residue stream may be clean enough for direct venting to the atmosphere.

The spiral-wound membrane module contains one or more feed-side baffles aligned substantially lengthwise with respect to the module, thereby forming a feed channel divided into at least two segments connected in series, through which the vent stream flows sequentially as it passes along the feed channel. Thus the method of the invention uses gas-separation processes operated at a feed velocity that is at least two times higher than would be possible with a conventional spiral-wound module under equivalent conditions. Other arrangements of baffles, including baffles on both feed and permeate sides, are possible.

Most preferably, the feed inlet port is positioned near the central permeate pipe of the spiral-wound module, and directs the feed stream into the portion of the feed channel near the core of the module. The feed outlet is positioned near the periphery of the module and collects the residue from the portion of the feed channel in the peripheral region of the module. The flow path for the feed stream thus provides a flow vector that is from the core of the module to the periphery, that is radially outward. Meanwhile, the volatile-enriched permeate flows in the conventional manner radially inward to the central permeate collection pipe. The result is at least partially counter-current feed/permeate flow.

The higher feed velocity, preferably combined with counter-current flow, provides improved vapor recovery capabilities, even with small vent flows of 10 scfm, 5 scfm, 2 scfm, or less. Furthermore, this improved capability is provided in many cases by a single module, without having to resort to using multiple smaller modules in series.

An example of these small flows is vapor emissions at gasoline dispensing stations. Fugitive emissions of fuel vapor can occur both at the point where the dispensing nozzle contacts the fill pipe of the automobile gasoline tank, and at the storage tank vent pipe. Current vacuum-assisted vapor recovery boots on dispensing nozzles have reduced emissions by sucking vapor and air into the nozzle and redirecting the mixture back to the storage tank. However, as the vapor pressure within the tank increases, the air/fuel vapor mixture vents to the atmosphere through the tank vent pipe.

As applied to the above example, the present invention provides a method for controlling vapor emissions at the storage tank vent pipe. A spiral-wound membrane module is installed in the tank vent line. An air/fuel vapor mixture, consisting of the vapor and air drawn in by the nozzle and the gas phase overlying the liquid fuel in the tank, forms the feed stream to the membrane module. The fuel vapor permeates the membrane, and is recovered and returned to the storage tank. The feed-side residue, now depleted in fuel vapor, may be discharged or subjected to further treatment.

DESCRIPTION OF THE INVENTION

As used herein, percentages are by volume unless otherwise specified.

The invention is a method for treating vapor emissions from tanks containing volatile liquids. In its most general aspect, the invention applies to any tank containing a potentially volatile liquid.

In one specific aspect, the invention applies to tanks used to store vehicle fuels, such as ground transportation, aviation or marine fuels, particularly gasoline and other hydrocarbon fuels.

In a narrower aspect, the invention applies to control of gasoline vapor emissions at retail automobile gasoline stations.

Figure 1:
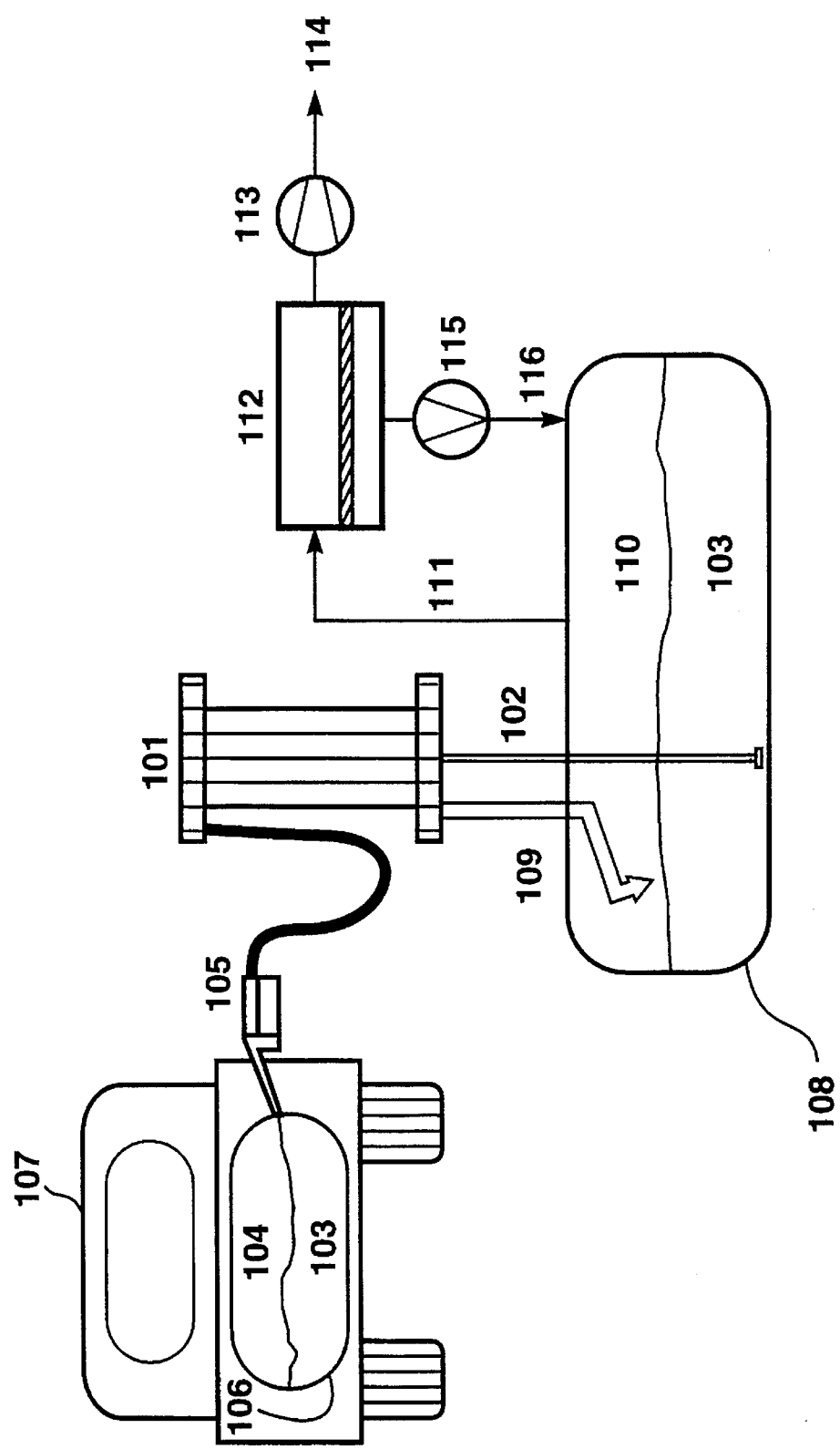
FIG. 1 is a schematic diagram of a membrane system used to recover vapor emissions from storage tanks at gasoline retail stations.

FIG. 1 shows a representative scheme of how the method of the invention may be applied to control of gasoline vapor emissions at retail gasoline stations. Gasoline, 103, is pumped from an underground storage tank, 108, via pipe, 102, through a dispensing system, 101, and nozzle, 105, into the fuel tank, 106, of an automobile, 107. The nozzle draws hydrocarbon vapor, 104, from the automobile, and optionally, ambient air, back into the storage tank via vapor return line 109. The gas phase, 110, above the liquid gasoline in tank 108 consists of a mixture of hydrocarbon vapors, air and other lesser components or contaminants, such as water vapor. This mixture is drawn into the membrane module, 112, as feed stream, 111, by overpressure in the storage tank and an optional permeate-side vacuum pump, 115. The vacuum pump directs the hydrocarbon-enriched permeate, 116, back into the storage tank. Hydrocarbon-depleted air, 114, is vented to the atmosphere, with the aid of an optional small blower, 113.

An important feature of this method is the membrane module used to carry out the separation. The membrane module, 112, is conventional insofar as it contains a membrane, usually folded to make a membrane envelope, and rolled around a perforated permeate collection pipe, to provide membrane feed-side and permeate-side channels for gas flow.

The module differs from the conventional spiral-wound module in that it contains one or more baffles along the length of the feed channel, that is, substantially parallel to the permeate pipe. The baffles extend for most, but not all, of the length of the feed channel and divide it into a series of parallel sub-channels or channel segments. The baffles are positioned such that the segments connect end to end, so that the feed stream flows through them in sequence. Most preferably, the module also differs from conventional spiral-wound modules in that it provides at least partial counter-current flow between the feed and permeate streams. This counter-current flow is achieved without needing a sweep or carder fluid to be provided on the permeate side, and therefore, without requiring a fourth port in the module. To our knowledge, this is different from all other spiral-wound, gas-separation membrane modules that have previously been available to the art.

A preferred configuration for a module that can be used to carry out the method of the invention is shown in schematic form in FIG. 2, which shows a sectional view of the module with the membrane envelope in an unwound state, and in which the elements of the drawing are identified as follows:

1 Permeate pipe
2 Open end of permeate pipe
3 Permeate stream
4 Closed end of permeate pipe
5 Perforations
6 Membrane
7 Baffle in feed channel
8 Sealed edges
9 Feed inlet port
10 Residue outlet port
11 Feed flow direction
12 Permeate flow direction Permeate collection pipe, 1, forms the core of the module, around which one or more membranes, 6, are wrapped. The permeate pipe has an open end, 2, through which the permeate stream exits the module as indicated by arrow, 3. The other end of the pipe, 4, is closed, so that no gas can enter the module at this end. The pipe is provided with perforations, 5, of any convenient number, shape and spacing, through which the permeate is drawn into the permeate pipe.

The membrane, 6, shown unrolled in the figure to more clearly illustrate the invention, would be rolled around the permeate pipe when the module is manufactured, to create channels on the feed side and permeate side of the membrane through which gas may flow. Preferably, the membrane sheet is first folded to make a membrane envelope, which is positioned with the folded edge adjacent the permeate pipe, so that the inside of the envelope forms the feed side and the outside the permeate side. Alternatively, unfolded sheets may be used and glued together, or to the permeate pipe, in such a way that the feed channel and the permeate channel are sealed from one another. The channels on the feed and permeate sides of the membrane are normally kept open by spacers, which are not shown in the drawing for simplicity.

The ends and edges of the membranes are sealed as generally indicated by shaded areas, 8. In particular, the ends of the membranes at the feed end of the module are sealed except for a region on the feed side indicated by 9 in the drawing, which is positioned close to the permeate pipe and which forms the inlet port to the feed channel. The ends of the membranes at the residue end of the module are sealed except for a region on the feed side indicated by 10 in the drawing, which is positioned close to the outer edge of the membrane sheet, which will be at the periphery of the module when rolled, and which forms the feed outlet port. As in a conventional module, the ends of the membranes on the permeate side at the feed and residue ends of the module are completely sealed, so that permeate cannot escape from the module except through the permeate pipe.

Figure 2:
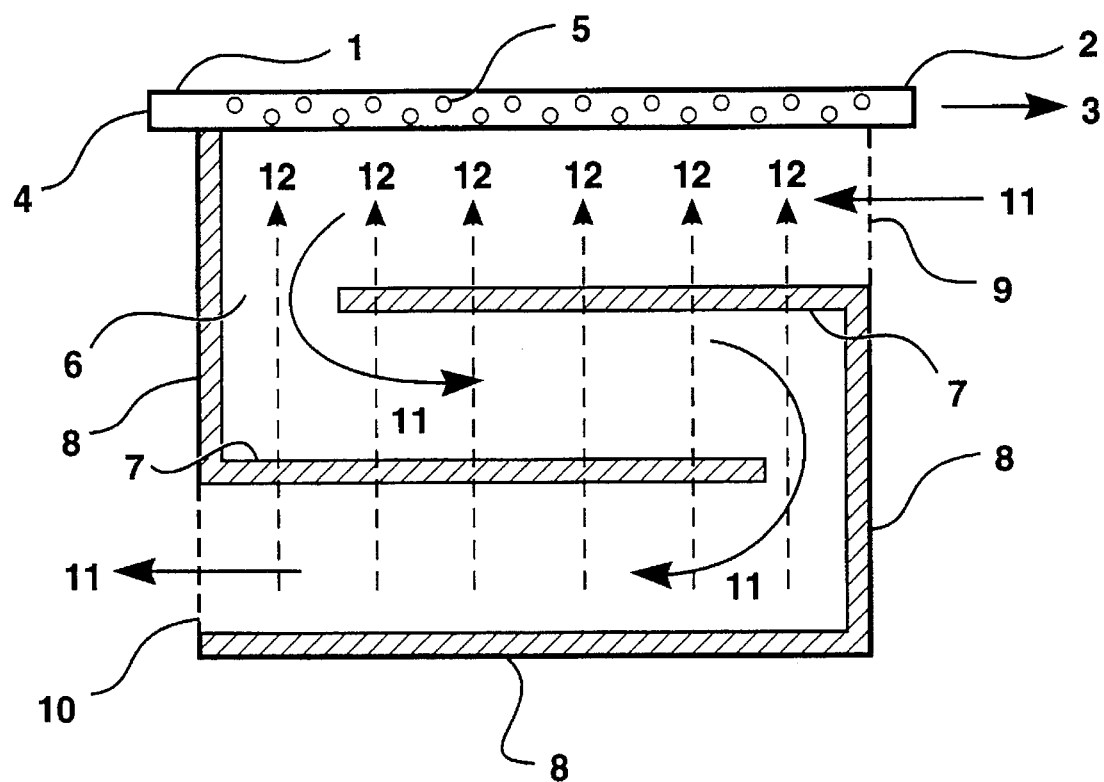
FIG. 2 is a schematic diagram showing directions of feed and permeate flow in a two-baffled module with feed channel inlet close to the permeate pipe.

In the sectional drawing of FIG. 2, the feed side of the membrane is uppermost, so that the area of membrane, 6, represents the area of one feed channel. Obviously, if there are multiple membranes or membrane envelopes in the module, there will be multiple feed channels. The feed channel contains two baffles, 7, which are aligned at least approximately parallel to the permeate pipe. The baffles partition the feed channel into three segments, with the segments connected in series and to the inlet and outlet ports so as to form successive portions of the same flow path, so that when the module is in use, the feed stream flows through them in sequence as shown by arrows, 11.

Since the feed inlet port is positioned near the central permeate pipe and the feed outlet is positioned near the periphery of the module, the flow path for the feed stream provides a flow vector that is from the core of the module to the periphery, that is radially outward. Meanwhile, the permeate flows in the permeate channel, which lies beneath the feed channel in the view of FIG. 2, in a conventional manner, that is, radially inward to the central permeate collection pipe, as indicated by dashed arrows, 12. The result is at least partially counter-current feed/permeate flow.

Figure 3:
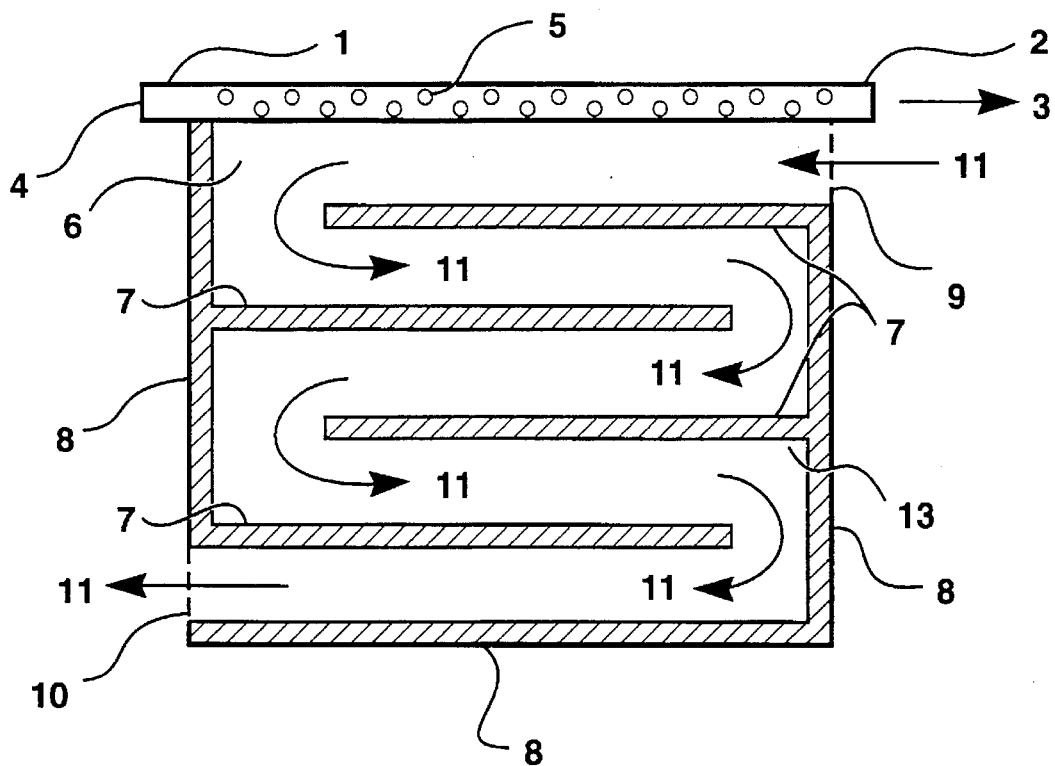
FIG. 3 is a schematic diagram showing directions of feed and permeate flow in a four-baffled module with feed channel inlet close to the permeate pipe.

FIG. 2 shows two baffles, dividing the feed channel into three segments. It will be apparent to those of skill in the art that the number of baffles is a matter of choice. An example of an embodiment with more baffles is shown in FIG. 3, in which four baffles are used. Like elements of the FIG. 3 drawing are numbered as in FIG. 2, except that the underlying permeate flow pattern, arrows 12 of FIG. 2, has been omitted for clarity.

Increasing the number of baffles has advantages and disadvantages. Once a partial counter-flow effect has been achieved by adding a radially outward vector to the feed flow direction, such as with the two baffles in FIG. 2, adding more baffles is unlikely to improve the counter-flow effects significantly. Furthermore, increasing the number of baffles increases the number of corners, one representative of which is shown as 13 on FIG. 3, where pockets of stagnant feed fluid may develop. On the other hand, a greater number of baffles reduces the width of the flow channel, thereby increasing the velocity of a given feed flow along the channel. This increase in velocity can be very beneficial in avoiding concentration polarization and consequent loss of separation performance.

Thus the optimum number of baffles will vary depending on the separation to be performed and the operating constraints. As a guideline, we prefer to use between one and six baffles for most processes, with two or four being most preferred. Less desirably, an odd number of baffles, such as one, three, five and so on, may be used, in which case the residue will exit the module at the same end as the feed.

FIGS. 2 and 3 show module designs in which the permeate pipe is open at one end only. It will be apparent to those of skill in the art that the module can be configured so that both ends of the permeate pipe are open, as is shown in FIGS. 18 and 19 of copending applications 08/535,983 and 08/536,633, for example. As also discussed in those copending applications, the permeate pipe may contain perforations only towards one end, to provide an increased degree of counter-current effect. Further, essentially complete counter-current flow can be provided, if desired, by placing baffles in the permeate channel in the same positions as in the feed channel.

As yet another option, the modules used in the invention may have baffles spaced progressively closer to one another, as in co-owned and copending application 08/537,271, to progressively reduce the width of the feed channel from the feed to the residue end. Such designs can maintain a gas stream velocity along the length of the feed channel that is close to the velocity at the feed inlet.

An important aspect of the invention is that it provides a feed velocity in the feed channel much greater than the feed velocity that would be obtained with a conventional unbaffled spiral-wound module, in which the width of the flow channel is the whole width of the membrane envelope. This aspect is particularly important in treating the small streams having flow rates less than about 10 scfm, which are common in tank venting, and which are difficult to treat satisfactorily using a conventional module.

For example, with two baffles in the module, the feed channel has three segments and the feed velocity along a segment is three times what it would be in an unbaffled module having the same membrane width and length. If there are four baffles in the module, the feed channel has five segments and the feed velocity along a segment is five times what it would be in an unbaffled module. Thus, for example, a 1-scfm flow rate through a conventional module of given membrane and spacer area and geometry may yield a feed channel velocity of 0.5 m/s. A similarly constructed 2-baffle (3-segment feed channel) module in accordance with the invention would have a feed channel velocity of 1.5 m/s.

Increasing the number of baffles has some potential disadvantages, however, because, as discussed above with reference to FIG. 3, increasing the number of baffles increases the number of corners, where pockets of stagnant feed fluid may develop. It will be apparent to those of skill in the art that the number of baffles is a matter of choice, based on the specifics of the separation to be performed.

The design outlined in FIG. 1 is a representative example of a system that could be employed with the modules and methods of the invention. It will be appreciated by those of skill in the art that additional or alternative pumps, blowers, controls, valves, and regulators may optionally be installed to carry out the method of the invention, and are within the scope of the invention. For example, in FIG. 1, driving force for membrane permeation is provided by vacuum pump, 115. Any convenient means of providing driving force may be substituted for the vacuum pump, such as a compressor in feed line, 111.

The method of the invention may be carried out intermittently, in response to temperature and pressure changes in the storage tank brought about by environmental influences. Typically, the system may include sensors and controllers that start the membrane unit running as needed in response to a rise in pressure in the storage tank above a chosen value. As non-limiting alternatives, the system could be activated by the action of dispensing fuel, or could be run by pulling small amounts of gas out of the head space of the storage tank continuously. It will be apparent to those of skill in the art that the operating mode is a matter of choice, depending on the operating environment and other factors.

The combination of increased feed channel velocity and optional counter-current flow, as provided by the baffled modules and methods of the invention, offers significant improvement in separation performance over that of conventional unbaffled modules.

The method of the invention is particularly useful for fuel vapor recovery in conjunction with a vacuum-assisted recovery system at the dispensing nozzle. Fugitive emissions of fuel vapor can occur both at the point where the dispensing nozzle contacts the fill pipe of the automobile gasoline tank, and at the storage tank vent pipe. With the current bootless vapor recovery system on fuel nozzles, air and the fuel vapor are drawn in at the nozzle and returned to the storage tank. However, as more air/vapor mixture is returned to the tank, the pressure within the tank increases and the air/vapor mixture vents to the atmosphere through the tank vent pipe. The operation of a membrane system in accordance with the method of the invention at the tank vent pipe would allow more of this mixture to be removed from the tank and preferentially separated, with the hydrocarbon-enriched vapor returned to the tank and the hydrocarbon-depleted air vented, thus reducing emissions at the tank vent pipe. As the air/vapor mixture is removed from the tank, more air and hence, more fuel vapor, can be drawn in at the nozzle, thereby reducing emissions at the nozzle/fill pipe connection.

The invention has so far been described in one specific aspect as it relates to emissions control at retail gasoline stations for automobiles. In a more general aspect, the invention can obviously be applied to many other fuel storage and transfer operations, such as transfer from underground tanks at tank farms into tanker trucks; from tanker trucks into underground storage tanks at gasoline retail stations and other fueling sites; from storage tanks into small tank trucks used for off-site refueling; and dispensing of fuels into vehicles other than automobiles, such as, trucks, construction vehicles, aircraft, boats, and ships. In this aspect, the method of the invention is applicable to any fuel containing one or more volatile components, including automobile, aviation and marine grades of gasoline, aviation jet engine fuels, and other hydrocarbon fuels. The method of the invention enables the volatile component or components of the fuel, which are typically, but not necessarily, the lighter hydrocarbons, such as methane, ethane, propane, butane, pentane, hexane and heptane, to be recovered from the tank vent gas.

Figure 4:
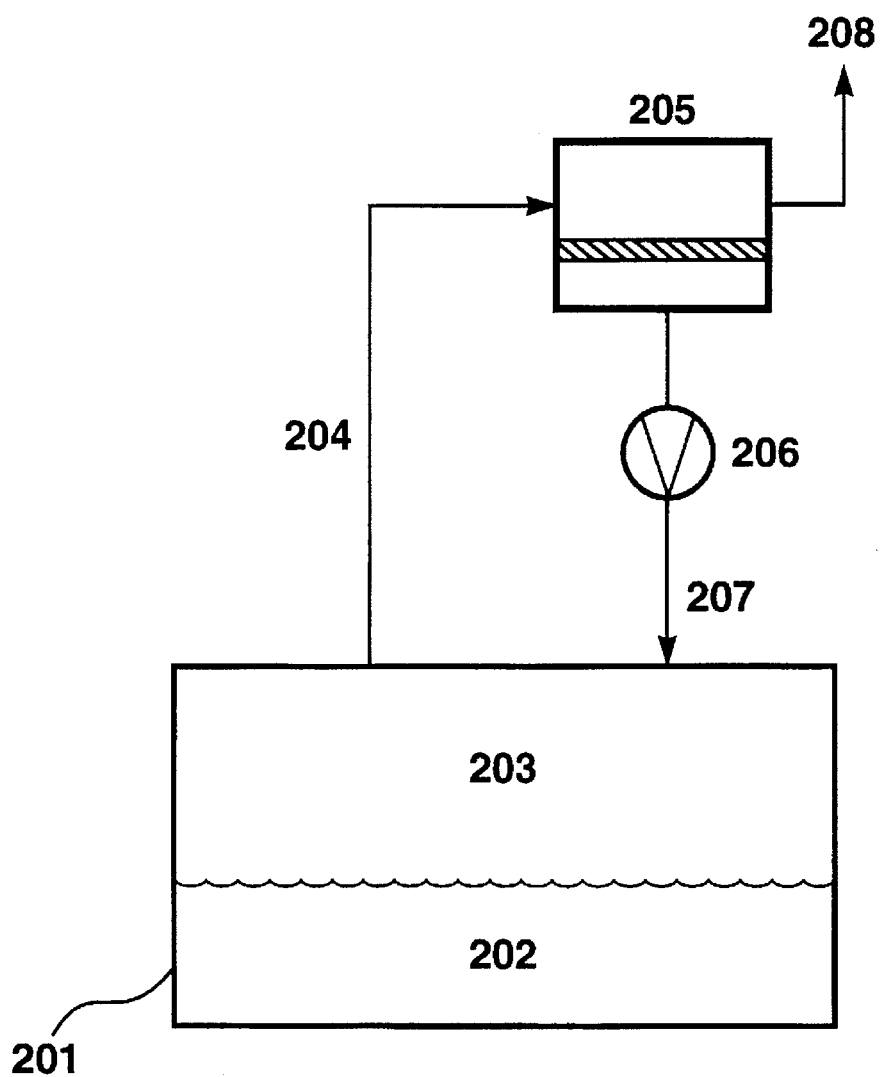
FIG. 4 is a schematic diagram of a membrane system used to control emissions from a liquid storage tank.

In its most general sense, the invention applies to control of emissions from any tank containing a liquid component volatile enough to lose vapor through a vent. Typical volatile compounds stored in tanks include all types of chlorinated solvents, for example, trichloroethylene, trichloroethane, perchloroethylene, methylene chloride and so on. Other liquids that can give rise to undesirable emissions include, but are not limited to, xylenes, esters, ketones and various aromatic organic compounds. FIG. 4 shows a representative example of how the method of the invention may be applied in the general case. Tank, 201, contains a liquid, 202, which has at least one volatile component. Gas phase, 203, above the liquid, typically, but not necessarily, contains a mixture of vapor and air, or vapor and an inerting gas, such as nitrogen. Changes in the environment of the tank, such as a rise in temperature, can give rise to breathing losses through the tank vent line, 204. Gas may also be expelled from the tank into the vent line during filling of the tank, or during maintenance or cleaning operations, for example. Depending on the volatility of the material in the tank, and the pressure and temperature conditions within the tank, the concentration of vapor or vapors in the gas phase above the liquid may be anything from a few ppm, such as 10, 50, or 100 ppm, to a significant percentage, such as 5, 10, 20, or 40%, to the bulk of the gas phase, such as 60 or 70%, or above.

Absent the membrane unit, 205, gas of this composition would be emitted whenever a portion of the gas phase is displaced from the tank, either directly through the vent line, or more typically in response to the opening of a pressure-release valve installed in the line.

As provided by the invention, gas passing along the vent line, 204, forms the feed stream to membrane unit, 205. The membrane unit contains one or more spiral-wound membrane modules. The module contains a membrane that is selective for at least one vapor component over the air or blanketing gas. The module is configured as described above, containing one or more feed-side baffles to provide a high gas velocity, such as at least about 2 m/s, more preferably at least about 5 m/s, and most preferably at least about 10 m/s in the module feed channels. These relatively high feed velocities are obtainable even though the flow rate of the raw vent gas to be treated is low, such as no more than about 10 scfm, no more than about 5 scfm, or no more than about 2 scfm. Also, these high velocities can be obtained from a single module, so that the need for multiple very small modules in series is avoided. Optionally, the module is also configured as described above to provide at least partial counter-current flow between the feed and permeate streams.

As shown in FIG. 4, a driving force for membrane permeation is provided by vacuum pump, 206, installed on the permeate side of the membrane in the return line, 207, to the tank. It will be appreciated by those of skill in the art that a transmembrane pressure difference to drive the separation may be provided in a variety of ways, any convenient one of which may be used in the context of the invention. For example, if the contents of the tank are pressurized, the pressure in the vent line may provide a driving force, and a small compressor might be installed in the return line to recompress the recovered vapor before returning it to the tank. As a second example, a compressor could be used in the feed line to the membrane unit.

The permeate gas is substantially enriched in vapor content, such as two times, five times, or 10 times enriched compared with the raw vent gas, and is returned to the tank through return line, 207. The permeate may be returned as vapor, or may be partly or fully condensed and returned as a liquid. The residue stream from the membrane unit is substantially depleted in vapor content, and is discharged through vent 208 to the atmosphere. In this way, emissions of tank vapors may be reduced by as much as 80%, 90%, or 95% or more compared with conventional tank venting systems that release the raw vent gas.

Depending on the vapors being treated and the composition of the raw vent gas, it is frequently possible to reduce the vapor content of the treated vent gas to no more than about 5%, no more than about 1%, or no more than about 0.1%. In the treatment of gasoline vapors, removal to less than about 1% may be difficult, because of the high concentration of vapor in the raw gas and the presence of very light hydrocarbons, such as ethane, which are less well separated by many membranes.

As an alternative to direct discharge, the residue stream could be subjected to additional treatment. If the residue stream contains mostly nitrogen or another inerting gas, it may be preferred, rather than venting, to capture this gas for reuse.

The invention is now illustrated by the following examples, which are intended to be illustrative of the best mode of carrying out the invention, but are not intended to limit the scope or underlying principles of the invention in any way.

EXAMPLES

Example 1 Effect of Feed Flow Rate

A 6-inch square of silicone rubber membrane was mounted in a test cell, and tested in modes that simulated three module flow configurations—co-flow, cross-flow, and counter-current flow—at four different feed flow rates. All tests used a feed gas mixture of 20% butane/80% nitrogen at 15 psia. Permeate pressure was maintained at 2 psia with a vacuum pump. The results are given in Table 1. In all operating modes, removal performance decreases as feed flow rate increases, due to the change in the ratio of feed flow rate to membrane surface area. In a real system, the membrane area would be chosen based on the expected flow rate. At a given flow rate, the counter-current flow mode gives better removal than the other modes.

TABLE 1

Results of Feed Flow Rate Variation Experiments for Co-Flow, Cross-Flow, and Counter-Current Flow Configurations.

| Feed flow rate (scfm) | Co-flow butane residue conc. (vol %) | Cross-flow butane residue conc. (vol %) | Counter-flow butane residue conc. (vol %) | Co-flow % removal of butane from feed (%) | Cross-flow % removal of butane from feed (%) | Counter-flow % removal of butane from feed (%) |
|---|---|---|---|---|---|---|
| 0.035 | 12.31 | 11.15 | 10.59 | 51.6 | 55.6 | 59.1 |
| 0.07 | 15.31 | 14.99 | 15.05 | 34.1 | 34.6 | 35.2 |
| 0.14 | 17.40 | 17.27 | 17.24 | 18.2 | 18.5 | 19.0 |
| 0.21 | 18.38 | 18.32 | 18.32 | 12.8 | 13.0 | 13.0 |

Example 2 Effect of Permeate Pressure

Using the general procedure of Example 1, the membrane was tested in the three simulated module flow configurations at varying permeate pressures. In all cases, the feed gas mixture was 20% butane/80% nitrogen, at a feed flow rate of 0.07 scfm at 15 psia.

Table 2 shows that as the permeate pressure is increased, the performance of the membrane decreases. Higher permeate pressures provide smaller differences in feed-side and permeate-side partial pressures, resulting in decreased flux through the membrane. The counter-current flow mode provides consistently better butane removal than the other modes.

TABLE 2

Results of Permeate Pressure Variation Experiments for Co-Flow, Cross-Flow, and Counter-Current Flow Configurations.

| Permeate pressure (psia) | Co-flow butane residue conc. (vol %) | Cross-flow butane residue conc. (vol %) | Counter-flow butane residue conc. (vol %) | Co-flow % removal of butane from feed (%) | Cross-flow % removal of butane from feed (%) | Counter-flow % removal of butane from feed (%) |
|---|---|---|---|---|---|---|
| 0.5 | 10.65 | 10.77 | 10.37 | 55.9 | 55.5 | 57.3 |
| 1.0 | 12.38 | 12.37 | 11.89 | 47.6 | 47.8 | 49.9 |
| 2.0 | 15.31 | 15.16 | 15.05 | 34.1 | 34.0 | 35.2 |
| 4.0 | 18.34 | 18.45 | 18.07 | 15.9 | 15.9 | 17.4 |

Example 3 Construction of Baffled Modules

Five bench-scale spiral-wound modules were constructed using silicone rubber membrane, a fine polypropylene mesh permeate spacer, and a coarser mesh feed spacer. The membranes and spacers used were the same in all modules, except as noted. Table 3 lists the module configurations. Module #603 is a representative unbaffled module; module #701 is the base-case baffled module with three flow channel segments; module #702 is similar to #701 but uses one long membrane envelope equal in size to the two standard sized envelopes used in the other designs; module #703 has five flow channel segments instead of three; and module #704 uses only one membrane envelope with a high flux (thin selective layer) membrane and has three flow channel segments. All modules contained approximately 1 m$^2$ membrane area, except module #704, which contained approximately 0.5 m$^2$ membrane area.

TABLE 3

Summary of Membrane Module Configurations.

| Module ID Number | No. of Feed Flow Channel Segments | Selective Layer Thickness (μm) | No. of Membrane Envelopes | Membrane Envelope Size (m$^2$) | Membrane Surface Area (m$^2$) |
|---|---|---|---|---|---|
| 603 | 1 | 3.5 | 2 | 0.55 | 1.1 |
| 701 | 3 | 3.5 | 2 | 0.55 | 1.1 |
| 702 | 3 | 3.5 | 1 | 1.1 | 1.1 |
| 703 | 5 | 3.5 | 2 | 0.55 | 1.1 |
| 704 | 3 | 1.5 | 1 | 0.50 | 0.5 |

Example 4 Effect of Feed Flow Rate in Modules

The modules of Example 3 were tested in a bench-scale module test system equipped to measure feed, residue, and permeate flow rates and pressures. The permeate pressure was adjusted by a throttle valve on the permeate side of the membrane. Stream compositions were analyzed by gas chromatography.

Using the above general procedure, the unbaffled module, #603, and baffled module #701 were tested with a feed stream of 20% butane/80% nitrogen. The permeate pressure was maintained at 2 psia with a vacuum pump, and the feed pressure was 15.5 psia. The feed flow rate was varied at 0.25, 0.5, and 0.75 scfm. These feed flow rates correspond to feed channel velocities of approximately 0.18, 0.35, and 0.53 m/s in the conventional module, and 0.54, 1.1, and 1.59 m/s in the baffled module. Table 4 shows the residue concentrations and the removal rates of butane for the two modules at the different flow rates.

TABLE 4

Results of Feed Flow Rate Variation on Unbaffled and Baffled Modules.

| Feed Flow Rate (scfm) | Unbaffled Module #603 | | Baffled Module #701 | |
|---|---|---|---|---|
| | Residue Conc. (vol %) | % Butane Removal (%) | Residue Conc. (vol %) | % Butane Removal (%) |
| 0.25 | 0.22 | 99.7 | 0.06 | 99.9 |
| 0.5 | 2.6 | 93.0 | 0.85 | 97.6 |
| 0.75 | 4.6 | 84.9 | 2.5 | 91.8 |

Example 5

Using the general procedure of Example 4, the unbaffled module and baffled module #702 were tested with a feed stream of 20% butane/80% nitrogen. The permeate pressure was maintained at 2 psia with a vacuum pump, and the feed pressure was 15.5 psia. The feed flow rate of 0.5 scfm corresponds to a feed channel velocity of approximately 0.35 m/s in the conventional module, and 1.1 m/s in the baffled module. The removal rate of butane in the conventional module was 91.9%. The baffled module had a butane removal rate of 94.3%.

Example 6

Using the general procedure of Example 4, the unbaffled module and baffled module #703 were tested with a feed stream of 20% butane/80% nitrogen. The permeate pressure was maintained at 2 psia with a vacuum pump, and the feed pressure was 15.5 psia. The feed flow rate of 0.5 scfm corresponds to a feed channel velocity of approximately 0.35 m/s in the conventional module, and 1.75 m/s in the baffled module. The removal rate of butane in the conventional module was 91.9%. The baffled module had a butane removal rate of 93.8%.

Example 7

Using the general procedure of Example 4, the unbaffled module and baffled module #704 were tested with a feed stream of 20% butane/80% nitrogen. The permeate pressure was maintained at 2 psia with a vacuum pump, and the feed pressure was 15.5 psia. The feed flow rate of 0.5 scfm corresponds to a feed channel velocity of approximately 0.35 m/s in the conventional module, and 0.43 m/s in the baffled module. The removal rate of butane in the conventional module was 91.9%. The baffled module had a butane removal rate of 96.9%.

Example 8 Effect of Feed Concentration

Figure 5:
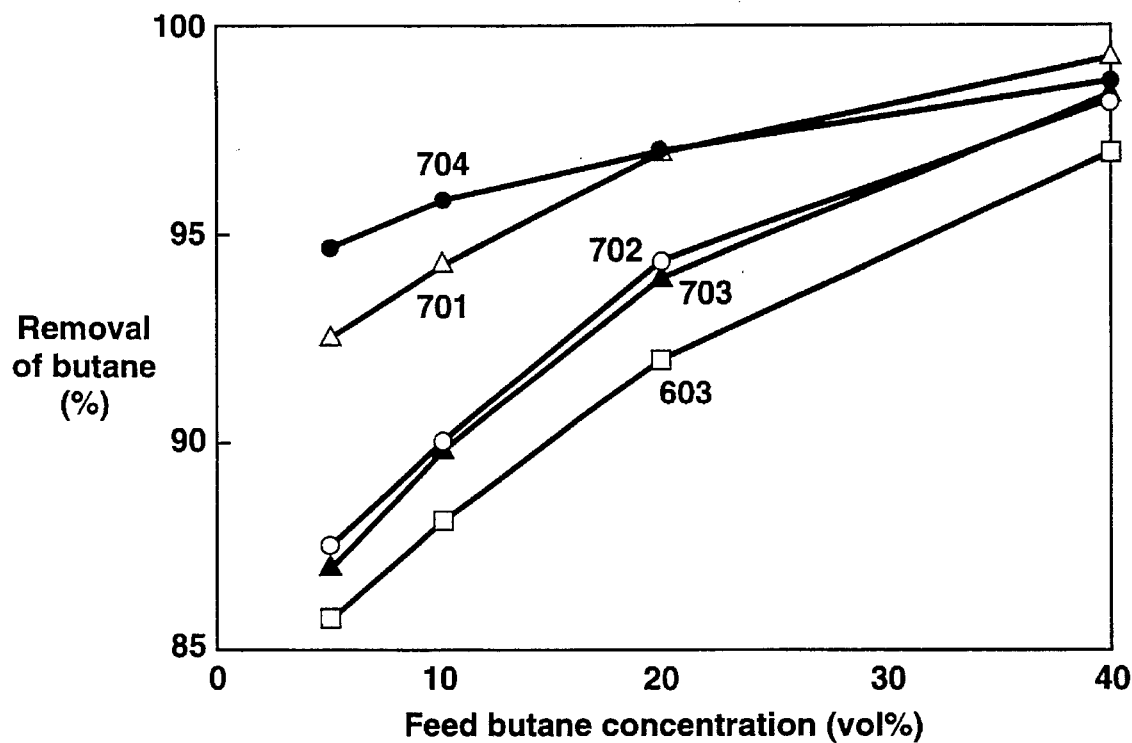
FIG. 5 is a graph showing the percentage of butane removal as a function of feed butane concentration.

Experimental data were gathered for the five modules as in Examples 4–7, but for different feed concentrations. The feed flow rate was 0.5 scfm, the feed pressure 15.5 psia, and the permeate pressure 2 psia. The feed butane concentration was varied at 5, 10, 20, and 40% butane in nitrogen. We used an in-house set of computer models to calculate the percentage of butane removed from the feed stream. The results are shown in FIG. 5, which plots the percentage removal of butane from the feed stream as a function of the feed butane concentration for the five modules. As the feed concentration of butane increases, the removal of butane from the feed stream increases. FIG. 5 indicates that there are significant differences in performance between the modules, as was also shown in Examples 4–7.

All the baffled modules performed better than the unbaffled module at all feed concentrations. The difference in performance between the baffled modules was most marked at low butane concentrations. Of the modules containing the same membrane, that is, #701, #702, and #703, module #701, with two membrane envelopes and two baffles forming three flow channel segments, performed best.

Example 9 Effect of Flow Configuration

Using the general procedure of Example 4, the unbaffled module and baffled module #701 were tested with a feed stream of 20% butane/80% nitrogen. This time the baffled module was operated in a co-flow configuration; that is, the direction of the feed flow was reversed, so that the feed and permeate were flowing in essentially the same direction. The permeate pressure was maintained at 2 psia with a vacuum pump, and the feed pressure was 15.5 psia. The feed flow rate of 0.5 scfm corresponds to a feed channel velocity of approximately 0.35 m/s in the conventional module, and 1.1 m/s in the baffled module. The removal rate of butane in the conventional module was 91.9%. The baffled module had a butane removal rate of 75.6%. Even with the increased feed channel velocity, the baffled module showed much poorer removal of butane than that of the conventional module, and that of the baffled modules operated in the counter-current flow configuration.

Example 10 Module Performance with Hydrocarbon Vapor

Two additional spiral-wound modules were constructed. Approximately 1m$^2$ of a 4-μm-thick silicone rubber composite membrane was folded into a rectangular envelope and, with feed and permeate spacer material in place, the membrane envelope was glued and wound around a permeate collection pipe. One module was made with two baffles in the feed channel, forming three flow channel segments. The baffles were formed by applying extra glue lines on the feed spacer material at appropriate positions within the feed channel. The other module was left unbaffled for comparative testing. Experiments were carried out using the general procedure of Example 4. The feed gas composition was 1% propane in nitrogen, and the feed flow rate was varied between about 0.2 and 0.6 scfm. Feed pressure was 5 psig and permeate pressure was 1 psia.

The data were used to calculate normalized fluxes and selectivities by means of an in-house cross-current flow computer model. The selectivities that are reported in this example are a function of the operating conditions and the module type, because the computer model is based on permeation equations that ignore concentration polarization effects and that are valid for cross-current flow conditions. Under these conditions, therefore, counter-current flow effects manifest themselves as a higher selectivity as compared to a module without baffles.

Figure 6:
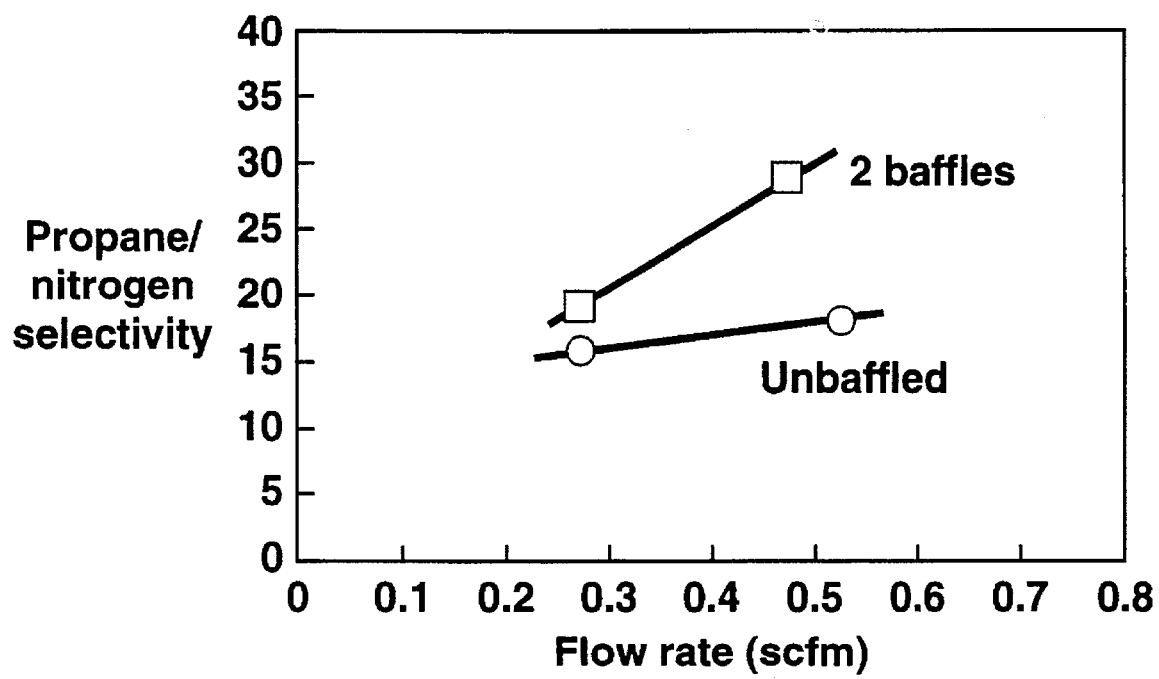
FIG. 6 is a graph of propane/nitrogen selectivity as a function of feed flow rate for baffled and unbaffled modules.

FIG. 6 shows the calculated selectivity as a function of feed flow rate. The selectivity obtained with the baffled module was significantly better than the selectivity obtained with the unbaffled module. The selectivity for both modules increased with increasing feed flow rate.

Example 11 Simulation of Gas Station Emissions Control

We performed a simulation of a gas station emissions control process in accordance with the invention. We assumed that the vent gas leaving the underground gasoline storage tank has a volume composition of approximately 40% gasoline/60% air. The gasoline vapor will normally be a mixture of $C_3$-$C_7$ straight and branched hydrocarbons, with minor amounts of lighter hydrocarbons and other materials. We further assumed that the flow rate of air being sucked in to control emissions at the gasoline dispensing nozzle was 0.6 scfm. The membrane area was fixed at 1 m$^2$. Table 5 shows the simulated membrane module performance of baffled and unbaffled modules for the recovery of gasoline vapors. The table shows that under the same operating conditions, the amount of gasoline vapor vented is reduced by more than 50% using the baffled module according to the invention.

TABLE 5

Simulated Membrane Module Performance for the Recovery of Gasoline Vapors from Storage Tank Vent Streams.

| Parameter | Value | |
|---|---|---|
| | Unbaffled Module | Baffled Module |
| Module selectivity (at average gasoline concentration of 20 vol % gasoline, 0.5 scfm average flow rate) | 24 | 44 |
| Feed flow rate (scfm) | 1.20 | 1.22 |
| Permeate flow rate (scfm) | 0.56 | 0.60 |
| Gasoline concentration in permeate (vol %) | 77.6 | 78.0 |
| Gasoline concentration in residue (vol %) | 6.7 | 3.2 |
| Removal (%) | 89.8 | 96 |
| Gasoline vapor vented (scfm) | 0.043 | 0.019 |

We claim:

1. A method for controlling vapor emissions from a tank containing volatile liquid, said tank having a vent system for releasing said vapor emissions from said tank, said method comprising:

(a) providing a spiral-wound membrane module having a feed side, a permeate side, and a permeate collection pipe having two ends and perforations through which gas can pass from said permeate channel into said permeate pipe, said module being adapted by providing one or more feed-side baffles aligned substantially lengthwise with respect to said module, thereby forming a feed channel divided into at least two segments connected in series, through which gas flows sequentially as it passes along said feed channel, said feed side of said module being connected to said vent system;

(b) passing a raw vent gas comprising said vapor emissions across said feed side;

(c) withdrawing from said feed side a treated vent gas depleted in vapor compared with said raw vent gas;

(d) withdrawing from said permeate side a permeate enriched in vapor compared with said raw vent gas;

(e) returning said permeate to said tank.

2. The method of claim 1, wherein an inlet port to said feed channel and an outlet port from said feed channel are connected to different segments of said feed channel, such that said segment connected to said inlet port is closer to said permeate pipe than said segment connected to said outlet port; thereby providing that gas flowing on said feed side flows at least partially counter-current to gas flowing on said permeate side.

3. The method of claim 1, wherein said module contains multiple membranes, multiple feed channels and multiple baffles.

4. The method of claim 3, wherein each feed channel contains two baffles.

5. The method of claim 3, wherein each feed channel contains four baffles.

6. The method of claim 1, wherein said raw vent gas comprises a fuel vapor.

7. The method of claim 1, wherein said raw vent gas comprises a solvent vapor.

8. The method of claim 1, wherein said raw vent gas comprises a hydrocarbon vapor.

9. The process of claim 1, wherein the flow rate of said raw vent gas to said feed side of said module is less than about 10 scfm.

10. The process of claim 1, wherein the flow rate of said raw vent gas to said feed side of said module is less than about 5 scfm.

11. The process of claim 1, wherein the flow rate of said raw vent gas to said feed side of said module is less than about 2 scfm.

12. The method of claim 1, wherein the concentration of said vapor in said treated vent gas is no greater than about 5 vol%.

13. The method of claim 1, wherein the concentration of said vapor in said treated vent gas is no greater than about 1 vol%.

14. The method of claim 1, wherein the concentration of said vapor in said treated vent gas is no greater about than 0.1 vol%.

15. The method of claim 1, wherein at least 90% of said vapor is removed from said raw vent gas.

16. The method of claim 1, wherein at least 95% of said vapor is removed from said raw vent gas.

17. The method of claim 1, wherein a driving force for membrane separation is provided by a vacuum pump connected to the permeate side of the membrane.

18. The method of claim 1, wherein said perforations in said permeate pipe are positioned only in the vicinity of one end.

19. The method of claim 1, wherein the vent gas velocity in said feed channel is at least about 2 m/s.

20. The method of claim 1, wherein the vent gas velocity in said feed channel is at least about 5 m/s.

21. The method of claim 1, wherein the vent gas velocity in said feed channel is at least about 10 m/s.

22. The method of claim 1, wherein said method is carried out in response to a change in pressure in said tank.

23. The method of claim 1, wherein said permeate is returned as a vapor.

24. The method of claim 1, wherein said permeate is at least partially liquid.

25. The method of claim 1, wherein said treated vent gas is discharged to the atmosphere.

26. A method for controlling fuel vapor emissions from a system comprising a fuel storage tank, a nozzle for dispensing fuel from said tank, and a vent for venting vapors and gases from said tank, said method comprising:

(a) providing a spiral-wound membrane module having a feed side, a permeate side, and a permeate collection pipe having two ends and perforations through which gas can pass from said permeate channel into said permeate pipe, said module being adapted by providing one or more feed-side baffles aligned substantially lengthwise with respect to said module, thereby forming a feed channel divided into at least two segments connected in series, through which gas flows sequentially as it passes along said feed channel, said feed side of said module being connected to said vent;

(b) passing a raw vent gas comprising fuel vapor from said tank across said feed side;

(c) withdrawing from said feed side a treated vent gas depleted in fuel vapor compared with said raw vent gas;

(d) withdrawing from said permeate side a permeate enriched in fuel vapor compared with said raw vent gas;

(e) returning said permeate to said tank.

27. The method of claim 26, wherein an inlet port to said feed channel and an outlet port from said feed channel are connected to different segments of said feed channel, such that said segment connected to said inlet port is closer to said permeate pipe than said segment connected to said outlet port: thereby providing that gas flowing on said feed side flows at least partially counter-current to gas flowing on said permeate side.

28. The method of claim 26, wherein said module contains multiple membranes, multiple feed channels and multiple baffles.

29. The method of claim 28, wherein each feed channel contains two baffles.

30. The method of claim 28, wherein each feed channel contains four baffles.

31. The method of claim 26, wherein said fuel comprises automobile fuel.

32. The method of claim 26, wherein said fuel comprises aviation fuel.

33. The method of claim 26, wherein said fuel comprises marine fuel.

34. The method of claim 26, wherein said fuel comprises gasoline.

35. The process of claim 26, wherein the flow rate of said raw vent gas to said feed side of said module is less than about 10 scfm.

36. The process of claim 26, wherein the flow rate of said raw vent gas to said feed side of said module is less than about 5 scfm.

37. The process of claim 26, wherein the flow rate of said raw vent gas to said feed side of said module is less than about 2 scfm.

38. The method of claim 26, wherein the concentration of said fuel vapor in said treated vent gas is no greater than about 5 vol%.

39. The method of claim 26, wherein the concentration of said fuel vapor in said treated vent gas is no greater than about 1 vol%.

40. The method of claim 26, wherein at least 90% of said fuel vapor is removed from said raw vent gas.

41. The method of claim 26, wherein at least 95% of said fuel vapor is removed from said raw vent gas.

42. The method of claim 26, wherein a driving force for membrane separation is provided by a vacuum pump connected to the permeate side of the membrane.

43. The method of claim 26, wherein said perforations in said permeate pipe are positioned only in the vicinity of one end.

44. The method of claim 26, wherein the vent gas velocity in said feed channel is at least about 2 m/s.

45. The method of claim 26, wherein the vent gas velocity in said feed channel is at least about 5 m/s.

46. The method of claim 26, wherein the vent velocity in said feed channel is at least about 10 m/s.

47. The method of claim 26, wherein said method is carried out in response to a change in pressure in said tank.

48. The method of claim 26, wherein said method is carried out in response to dispensing of said fuel through said nozzle.

49. The method of claim 26, wherein said permeate is returned as a vapor.

50. The method of claim 26, wherein said permeate is at least partially liquid.

51. The method of claim 26, wherein said treated vent gas is discharged to the atmosphere.

52. The method of claim 26, further comprising drawing air into said tank through said nozzle.

53. The method of claim 26, wherein said raw vent gas contains air.

* * * * *